(12) United States Patent
Hamaguchi et al.

(10) Patent No.: US 12,166,325 B2
(45) Date of Patent: Dec. 10, 2024

(54) TERMINAL-EQUIPPED WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takaaki Hamaguchi, Mie (JP); Takashi Kawakami, Mie (JP); Kazuo Nakashima, Mie (JP); Yusaku Maeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 178 days.

(21) Appl. No.: 18/011,296

(22) PCT Filed: Jun. 21, 2021

(86) PCT No.: PCT/JP2021/023361
§ 371 (c)(1),
(2) Date: Dec. 19, 2022

(87) PCT Pub. No.: WO2022/004457
PCT Pub. Date: Jan. 6, 2022

(65) Prior Publication Data
US 2023/0352858 A1   Nov. 2, 2023

(30) Foreign Application Priority Data
Jun. 29, 2020  (JP) ................ 2020-112049

(51) Int. Cl.
*H01R 4/70* (2006.01)
*H01R 13/52* (2006.01)
(Continued)

(52) U.S. Cl.
CPC .......... *H01R 4/70* (2013.01); *H01R 13/5216* (2013.01); *H01R 43/24* (2013.01); *H01R 11/12* (2013.01)

(58) Field of Classification Search
None
See application file for complete search history.

(56) References Cited

U.S. PATENT DOCUMENTS

| 2002/0027013 A1* | 3/2002 | Kondo ............. H01R 4/70 |
| | | 425/129.1 |
| 2016/0254615 A1* | 9/2016 | Sugita ............. H01R 13/5205 |
| | | 439/606 |

(Continued)

FOREIGN PATENT DOCUMENTS

| JP | H11-296646 A | 10/1999 |
| JP | 2016-126981 A | 7/2016 |

(Continued)

OTHER PUBLICATIONS

International Search Report issued on Aug. 31, 2021 for WO 2022/004457 A1 (4 pages).

*Primary Examiner* — Krystal Robinson
(74) *Attorney, Agent, or Firm* — Venjuris, P.C.

(57) ABSTRACT

A terminal-equipped wire for charging inlet is provided with a wire including a conductor and an insulation coating, and a terminal to be connected to the conductor exposed from an end part of the wire. The insulation coating has an olefin-based resin as a main component. The terminal-equipped wire is further provided with a molded resin portion for covering a region from a connection point of the conductor and the terminal to the insulation coating, and a primer layer (Continued)

provided between an inner peripheral surface of the molded resin portion and an outer peripheral surface of the terminal. The inner peripheral surface of the molded resin portion and an outer peripheral surface of the insulation coating are directly in contact.

5 Claims, 1 Drawing Sheet

(51) Int. Cl.
*H01R 43/24* (2006.01)
*H01R 11/12* (2006.01)

(56) References Cited

U.S. PATENT DOCUMENTS

| | | | |
|---|---|---|---|
| 2017/0117640 A1* | 4/2017 | Arenburg | H01R 4/34 |
| 2017/0323707 A1* | 11/2017 | Tachi | H01R 43/005 |
| 2017/0324235 A1* | 11/2017 | Tachi | H02G 1/145 |
| 2018/0336979 A1* | 11/2018 | Nakashima | B60R 16/0207 |
| 2019/0305443 A1 | 10/2019 | Yamashita et al. | |
| 2020/0099147 A1* | 3/2020 | Cola | H01R 13/03 |

FOREIGN PATENT DOCUMENTS

| | | |
|---|---|---|
| JP | 2018-133278 A | 8/2018 |
| WO | 2013/089171 A1 | 6/2013 |

\* cited by examiner

TERMINAL-EQUIPPED WIRE

CROSS REFERENCE TO RELATED APPLICATIONS

This application is a national phase of PCT application No. PCT/JP2021/023361, filed on 21 Jun. 2021, which claims priority from Japanese patent application No. 2020-112049, filed on 29 Jun. 2020, all of which are incorporated herein by reference.

TECHNICAL FIELD

The present disclosure relates to a terminal-equipped wire.

BACKGROUND

Patent Document 1 discloses a charging inlet provided in an electrically driven vehicle such as a hybrid vehicle. The charging inlet includes a housing for accommodating the tip of a terminal-equipped wire. The terminal-equipped wire for charging inlet includes a wire, a terminal and a water stop portion. The wire includes a conductor and an insulation coating covering the outer periphery of the conductor. The terminal is connected to the conductor exposed from the insulation coating in an end part of the wire. The water stop portion covers a region from a connection point of the conductor and the terminal to the insulation coating of the wire. The water stop portion suppresses the corrosion of the conductor and the terminal due to the adhesion of moisture to the connection point of the conductor and the terminal and the like.

PRIOR ART DOCUMENT

Patent Document

Patent Document 1: JP 2018-133278 A

SUMMARY OF THE INVENTION

Problems to be Solved

A terminal-equipped wire of the present disclosure is a terminal-equipped wire for charging inlet with a wire including a conductor and an insulation coating, the insulation coating having an olefin-based resin as a main component, a terminal to be connected to the conductor exposed from an end part of the wire, a molded resin portion for covering a region from a connection point of the conductor and the terminal to the insulation coating, and a primer layer provided between an inner peripheral surface of the molded resin portion and an outer peripheral surface of the terminal, the inner peripheral surface of the molded resin portion and an outer peripheral surface of the insulation coating being directly in contact.

DETAILED DESCRIPTION TO EXECUTE THE INVENTION

Technical Problem

Figure 1:
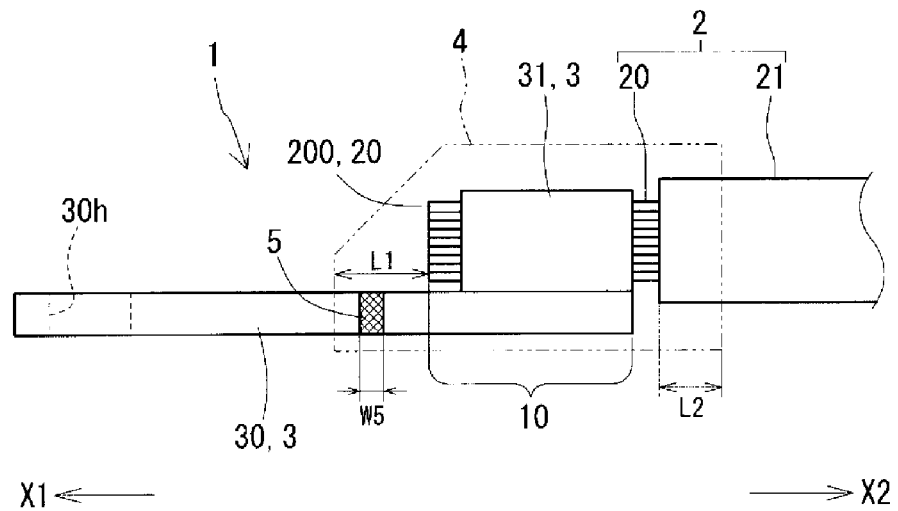
FIG. 1 is a schematic side view of a terminal-equipped wire for charging inlet according to one embodiment.

With the recent year development of electrically driven vehicles, a terminal-equipped wire for charging inlet tends to be used with a large current. Thus, a cross-sectional area of the wire tends to increase. It is difficult to bond a water stop portion to a large-diameter wire without gaps. Further, a conductor of the wire in which the large current flows tends to have a high temperature and the water stopping performance of the water stop portion may be reduced by a temperature increase. Therefore, it is desired to further improve the water stopping performance of the water stop portion and make the water stopping performance difficult to drop over a long period of time in the terminal-equipped wire for charging inlet.

Accordingly, one object of the present disclosure is to provide a terminal-equipped wire with a water stop portion excellent in water stopping performance.

Effect of Invention

The terminal-equipped wire of the present disclosure is provided with a molded resin portion serving as a water stop portion excellent in water stopping performance.

Description of Embodiments of Present Disclosure

The present inventors studied the configuration of a water stop portion in a terminal-equipped wire for charging inlet. In a terminal-equipped wire used with a large current, the number of strands constituting a conductor increases. If the number of the strands increases, more air is present in gaps between the strands. Accordingly, when the conductor generates heat due to the large current, a pressure inside an insulation coating is increased by air expansion. The present inventors acquired such knowledge that a considerable load was applied to the water stop portion due to this increase in the inner pressure of the wire. Based on this knowledge, the present inventors completed a terminal-equipped wire for charging inlet having a structure capable of withstanding an inner pressure increase of a wire. Embodiments of the present disclosure are listed and described below.

(1) A terminal-equipped wire according to an embodiment is a terminal-equipped wire for charging inlet with a wire including a conductor and an insulation coating, the insulation coating having an olefin-based resin as a main component, a terminal to be connected to the conductor exposed from an end part of the wire, a molded resin portion for covering a region from a connection point of the conductor and the terminal to the insulation coating, and a primer layer provided between an inner peripheral surface of the molded resin portion and an outer peripheral surface of the terminal, the inner peripheral surface of the molded resin portion and an outer peripheral surface of the insulation coating being directly in contact.

Here, the "main component" in this specification is a component most contained in a member.

The terminal-equipped wire according to the embodiment is provided with the molded resin portion excellent in water stopping performance and reliability.

The molded resin portion of the terminal-equipped wire functions as a water stop portion for suppressing the adhesion of moisture to the connection point of the terminal and the conductor. The primer layer is a layer containing a primer having affinity to the terminal made of metal and the molded resin portion. Thus, the terminal and the molded resin portion are particularly firmly bonded at the position of the primer layer and the intrusion of moisture to the connection point from the terminal side is effectively suppressed. Further, the molded resin portion formed by insert molding or the like is bonded to the insulation coating of the wire. Even if the primer layer is absent between the molded resin portion and the insulation coating, the intrusion of moisture to the connection point from the wire side is effectively suppressed. The bonding of the terminal and the molded resin portion and the bonding of the molded resin portion and the insulation coating are maintained for 120 hours in an environment having a temperature of 85° C. and a humidity of 85% as shown in a test example to be described later. From these, the molded resin portion of the terminal-equipped wire according to the embodiment is excellent in water stopping performance.

(2) As one aspect of the terminal-equipped wire according to the embodiment, the olefin-based resin is polyethylene or polypropylene.

Polyethylene and polypropylene are excellent in mechanical strength and insulation. Further, polyethylene and polypropylene are easily bonded to the molded resin portion made of resin.

(3) As one aspect of the terminal-equipped wire according to the embodiment, the primer layer has polyurethane or polypropylene as a main component.

Polyurethane and polypropylene are inexpensively and easily available. Further, polyurethane and polypropylene have affinity to both metal constituting the terminal and resin constituting the molded resin portion. Therefore, polyurethane and polypropylene are suitable as a material of the primer layer for improving the bondability of the molded resin portion to the terminal.

(4) As one aspect of the terminal-equipped wire according to the embodiment, the molded resin portion has polybutylene terephthalate or polyamide as a main component.

Polybutylene terephthalate and polyamide are excellent in heat resistance, durability and strength.

Details of Embodiment of Present Disclosure

Hereinafter, an embodiment of a terminal-equipped wire of the present disclosure is described based on the drawings. The same reference signs in figures denote the same components. Note that the present invention is not limited to a configuration shown in the embodiment, but is represented by claims and intended to include all changes in the scope of claims and in the meaning and scope of equivalents.

Embodiment 1

Hereinafter, a terminal-equipped wire 1 according to the embodiment is described based on FIGS. 1 and 2.
((Overall Configuration))

Figure 2:
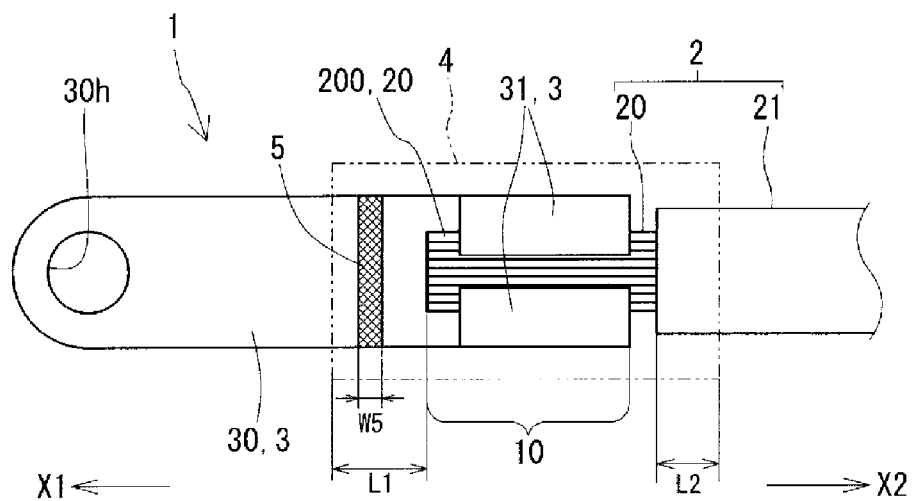
FIG. 2 is a schematic top view of the terminal-equipped wire for charging inlet according to the embodiment.

A terminal-equipped wire 1 of this example shown in FIG. 1 is used in a charging inlet to be mounted in an electrically driven vehicle. The use of the terminal-equipped wire 1 in the charging inlet can be specified from the size of the terminal-equipped wire 1 and the like. Similarly to a conventional configuration, this terminal-equipped wire 1 is provided with a wire 2 and a terminal 3. The terminal-equipped wire 1 of this example is further provided with a molded resin portion 4 for constituting a water stop portion and a primer layer 5 for improving the water stopping performance of the molded resin portion 4. Each component of the terminal-equipped wire 1 of this example is described below. In describing each component, a leftward direction toward the tip of the terminal-equipped wire 1 in figures is defined as a first direction X1 and a rightward direction away from the tip of the terminal-equipped wire 1 in figures is defined as a second direction X2.
((Wire))

The wire 2 includes a conductor 20 and an insulation coating 21 covering the outer periphery of the conductor 20. The wire 2 used in the charging inlet extends from the charging inlet to a battery. An entire length of the wire 2 is, for example, 500 mm or more and 2,000 mm or less. The entire length of the wire 2 may be 1,000 mm or more and 1,800 mm or less. A branch part as in a wiring harness is not present in the wire 2 of this example.

An outer diameter of the conductor 20 is, for example, 13 mm or more. A large current flows in the wire 2 used in the charging inlet. If the outer diameter of the conductor 20 is 13 mm or more, a cross-sectional area of the conductor 20 capable of withstanding use with the large current is secured. The terminal-equipped wire 1 has a size mountable in the electrically driven vehicle. Accordingly, the outer diameter of the conductor 20 is practically preferably 20 mm or less. A preferable outer diameter of the conductor 20 is 16 mm or more and 18 mm or less.

The conductor 20 is a stranded wire obtained by stranding a plurality of strands 200. The strands 200 are, for example, made of copper, copper alloy, aluminum, aluminum alloy or the like.

The insulation coating 21 has a polyolefin-based resin as a main component. Polyethylene, polypropylene or the like can be, for example, cited as the polyolefin-based resin. The polyolefin-based resin is excellent in bondability to the molded resin portion 4 to be described later. General additives used in resin molding can be cited as substances contained in the insulation coating 21 other than the polyolefin-based resin. A stabilizer, an antioxidant, a lubricant, a filler, a colorant, a flame retardant and the like can be, for example, cited as the additives.

The polyolefin-based resin is poor in flexibility as compared to a silicone-based resin. Accordingly, the wire 2 provided with the insulation coating 21 made of polyolefin-based resin is slightly difficult to bend. However, since the wire 2 used in the charging inlet is long, a problem hardly occurs in the arrangement of the wire 2 in the electrically driven vehicle even if the wire 2 is slightly difficult to bend. The polyolefin-based resin is better in bondability to the molded resin portion 4 than the silicone-based resin. In terms of improving the water stopping performance of the terminal-equipped wire 1, the polyolefin-based resin is better as a material of the insulation coating 21 than the silicone-based resin.

A thickness of the insulation coating 21 is, for example, 1.4 mm or more and 2.0 mm or less. A large current flows in the wire 2 used in the charging inlet. If the thickness of the insulation coating 21 is 1.4 mm or more and 2.0 mm or less, the insulation of the wire 2 in which the large current flows can be secured.
((Terminal))

The terminal 3 of this example includes a body portion 30 in the form of a flat plate and a wire barrel portion 31 provided in the body portion 30. A length of the body portion 30 is, for example, 10 mm or more and 24 mm or less. A thickness of the body portion 30 is, for example, 1.8 mm or more and 4.0 mm or less. The body portion 30 of this size can secure a sufficient conductor cross-sectional area.

The body portion 30 is provided with a through hole 30h. The through hole 30h is used to fix the terminal 3 to a housing of the charging inlet.

The wire barrel portion 31 grips the conductor 20 exposed from the insulation coating 21. Projecting pieces are provided on both sides of the body portion 30 and bent to sandwich the conductor 20, thereby configuring the wire barrel portion 31. An insulation barrel for gripping the insulation coating 21 of the wire 2 is not present in the terminal 3 of this example.

The terminal 3 is made of metal excellent in electrical conductivity. For example, the terminal 3 is made of copper, copper alloy, aluminum, aluminum alloy, nickel, nickel alloy or the like. A plating layer may be provided on the surface of the terminal 3. Tin and the like can be, for example, cited as a material of the plating layer.

((Molded Resin Portion))

The molded resin portion 4 functions as a water stop portion for suppressing the adhesion of moisture to a connection point 10 of the conductor 20 of the wire 2 and the terminal 3. The molded resin portion 4 of this example covers a region from the connection point 10 of the terminal 3 and the conductor 20 to the insulation coating 21 of the wire 2. The connection point 10 means an entire part in which the conductor 20 and the terminal 3 overlap in a length direction of the conductor 20. Accordingly, the connection point 10 includes the entire wire barrel portion 31 gripping the conductor 20, a part of the body portion 30 corresponding to the conductor 20 and a part of the conductor 20 arranged on the body portion 30. In other words, the molded resin portion 4 covers the outer periphery of the conductor 20 so that the conductor 20 is not exposed to an outside environment.

The molded resin portion 4 extends further than the tip of the conductor 20 in the first direction X1. A distance L1 between an end part of the molded resin portion 4 and the tip of the conductor 20 in the first direction X1 is, for example, 5 mm or more and 15 mm or less. If the distance L1 is 5 mm or more, a sufficient contact area of the terminal 3 and the molded resin portion 4 is secured. As a result, the bonding of the terminal 3 and the molded resin portion 4 is strengthened. If the distance L1 is 15 mm or less, the molded resin portion 4 does not become excessively long. The distance L1 is more preferably 7 mm or more and 10 mm or less.

A distance L2 between an end part of the molded resin portion 4 and an end surface of the insulation coating 21 in the second direction X2 is, for example, 5 mm or more and 15 mm or less. If the distance L2 is 5 mm or more, a sufficient contact area of the insulation coating 21 and the molded resin portion 4 is secured. If the distance L2 is 15 mm or less, the molded resin portion 4 does not become excessively long. The distance L2 is more preferably 7 mm or more and 10 mm or less.

The molded resin portion 4 has resin as a main component. The resin is preferably polybutylene terephthalate (PBT) or polyamide (PA). PBT and PA are excellent in heat resistance, durability and strength. The molded resin portion 4 is obtained by insert molding. The molded resin portion 4 and the insulation coating 21 of the wire 2 easily adhere to each other by the heat of the resin during insert molding.

General additives used in resin molding can be cited as components other than the resin in the molded resin portion 4. A stabilizer, an antioxidant, a lubricant, a filler, a colorant, a flame retardant and the like can be, for example, cited as the additives.

The molded resin portion 4 is molded using a mold for accommodating only the tip of the wire 2 mounted on the terminal 3. In this example, the primer layer 5 is formed on the terminal 3 before the molded resin portion 4 is molded. A formation method of the primer layer 5 is described later.

((Primer Layer))

The primer layer 5 is a bonding auxiliary layer containing a primer for improving the bondability of the molded resin portion 4 to the terminal 3. The primer layer 5 is provided between the inner peripheral surface of the molded resin portion 4 and the outer peripheral surface of the terminal 3. More specifically, the primer layer 5 is provided between a part of the inner peripheral surface of the molded resin portion 4 and a part of the outer peripheral surface of the body portion 30 of the terminal 3. The primer layer 5 is provided at a position further than the tip of the conductor 20 in the first direction X1. In the terminal-equipped wire 1 of this example, a bonding auxiliary layer equivalent to the primer layer 5 is not present in parts other than between the molded resin portion 4 and the terminal 3.

The primer layer 5 is annularly formed around the outer periphery of the body portion 30. The primer layer 5 of this example is not divided in a circumferential direction of the body portion 30. A width W5 of the primer layer 5 is preferably 3 mm or more and 10 mm or less. If the width W5 is 3 mm or more, the molded resin portion 4 is firmly bonded to the terminal 3. If the width W5 is 10 mm or less, the enlargement of the molded resin portion 4 can be avoided. The width W5 is more preferably 4 mm or more and 6 mm or less.

The primer layer 5 has a primer having affinity to both metal and resin as a main component. The primer is preferably polyurethane (PU) or polypropylene (PP). PU and PP may be PU and PP in which some elements are substituted with other elements. Chlorinated PP in which one part of hydrogen is substituted with chlorine can be, for example, cited as such PP. PU and PP have affinity to both the terminal 3 and the molded resin portion 4. Therefore, the bondability of the molded resin portion 4 to the terminal 3 is improved by the primer layer 5.

The primer layer 5 is formed by applying a primer solution, in which the primer is dissolved in a solvent, to the terminal 3. The primer solution is dried after being applied to the terminal 3. By forming the molded resin portion 4 to include a part applied with the primer solution, the primer layer 5 is formed between the terminal 3 and the molded resin portion 4. Alcohols such as methanol, ethanol and butanol or organic solvents such as acetone and toluene can be cited as the solvent of the primer solution. The primer layer 5 may contain part of the solvent.

((Miscellaneous))

In the terminal-equipped wire 1 of this example, the inner peripheral surface of the molded resin portion 4 and the outer peripheral surface of the insulation coating 21 are directly in contact. The molded resin portion 4 is easily bonded to the outer periphery of the insulation coating 21 made of resin when being molded on the outer periphery of the insulation coating 21. Therefore, the molded resin portion 4 and the insulation coating 21 are firmly bonded even if the primer is not present between the molded resin portion 4 and the insulation coating 21.

((Effects))

The molded resin portion 4 of the terminal-equipped wire 1 of this example suppresses the adhesion of moisture to the connection point 10 of the terminal 3 and the conductor 20. The primer layer 5 provided between this molded resin portion 4 and the terminal 3 strengthens the bonding of the molded resin portion 4 and the terminal 3. Thus, the intrusion of moisture to the connection point 10 from the side of the terminal 3 in the molded resin portion 4 is effectively suppressed. Further, the olefin-based resin constituting the insulation coating 21 of the wire 2 is excellent in bondability to the molded resin portion 4. Thus, the intrusion of moisture to the connection point 10 from the side of the wire 2 in the molded resin portion 4 is effectively suppressed.

In the terminal-equipped wire 1 of this example, the material of the insulation coating 21 of the wire 2, that of the molded resin portion 4 and that of the primer layer 5 are optimally selected. Thus, the molded resin portion 4 exhibits high water stopping performance in the terminal-equipped wire 1 for charging inlet exposed to a severe use environment. Moreover, high water stopping performance is maintained over a long period of time.

In the terminal-equipped wire 1 of this example, the primer layer 5 is provided only in a small part of the inner peripheral surface of the molded resin portion 4. Therefore, the terminal-equipped wire 1 of this example is better in terms of time and effort for production and cost than a configuration in which the primer layer 5 is provided on the entire inner peripheral surface of the molded resin portion 4.

Test Example 1

In Test Example 1, a plurality of terminal-equipped wires different in the configuration of a primer layer were produced and the water stopping performance of a molded resin portion in each terminal-equipped wire was examined.

((Sample No. 1))

The terminal-equipped wire 1 of Sample No. 1 is the terminal-equipped wire 1 having a structure shown in FIG. 1 of the embodiment. Dimensions and materials of the respective components are as follows.
  Wire 2
  Entire length . . . 500 mm
  Diameter . . . 16.9 mm
  Thickness of insulation coating 21 . . . 1.6 mm
  Material of insulation coating 21 . . . . PE resin
  Terminal 3
  Material . . . copper terminal with tin plating
  Molded resin portion 4
  Length . . . 40 mm
  Material . . . PBT resin
  Primer layer 5
  Width W5 . . . 4 mm
  Material . . . primer having polyurethane as a main component ((Sample No. 2))

The terminal-equipped wire 1 of Sample No. 2 is the same as the terminal-equipped wire 1 of Sample No. 1 except that the material of the primer layer 5 is a primer having chlorinated polypropylene as a main component.

((Test on Water Stopping Performance))

First, to reproduce the aging of the terminal-equipped wire 1 of each sample, an acceleration test was conducted by leaving the terminal-equipped wire 1 of each sample in the following environment.
  Temperature . . . 85° C.
  Humidity . . . 85%
  Time . . . 120 hours Subsequently, assuming a temperature when the terminal-equipped wire 1 of each sample is used, the terminal-equipped wire 1 of each sample was left in an atmosphere of 120° C.

Finally, the molded resin portion 4 of the terminal-equipped wire 1 of each sample was arranged in cold water, and air was fed into the inside of the wire 2 at a pressure of 10 kPa from an end part of the terminal-equipped wire 1 on a side opposite to the molded resin portion 4. Then, it was visually confirmed that a pressure value of a pressure meter indicated 10 kPa or more. If the pressure value of this pressure meter largely drops, it can be judged that leakage occurred at the position of the molded resin portion 4. The occurrence of leakage means that water is insufficiently stopped by the molded resin portion 4.

Leakage did not occur in both Sample No. 1 and Sample No. 2. Therefore, water stop between the terminal 3 and the molded resin portion 4 is thought to be ensured by the primer layer 5. Further, water stop between the insulation coating 21 of the wire 2 and the molded resin portion 4 is thought to be ensured even if a bonding auxiliary layer equivalent to the primer layer 5 is absent. From this result, it was found that the water stopping performance of the molded resin portion 4 was maintained over a long period of time according to the terminal-equipped wire 1 having the configuration according to the embodiment.

LIST OF REFERENCE NUMERALS 1 terminal-equipped wire
  10 connection point
2 wire
  20 conductor, 21 insulation coating, 200 strand
3 terminal
  30 body portion, 31 wire barrel portion, 30h through hole
4 molded resin portion
5 primer layer
L1, L2 distance
W5 width
X1 first direction, X2 second direction

What is claimed is:

1. A terminal-equipped wire for charging inlet, comprising:
  a wire including a conductor and an insulation coating, the insulation coating having an olefin-based resin as a main component;
  a terminal to be connected to the conductor exposed from an end part of the wire;
  a molded resin portion for covering a region from a connection point of the conductor and the terminal to the insulation coating; and
  a primer layer provided between an inner peripheral surface of the molded resin portion and an outer peripheral surface of the terminal,
  the inner peripheral surface of the molded resin portion and an outer peripheral surface of the insulation coating being directly in contact,
  a direction toward a tip of the terminal being a first direction,
  the molded resin portion extending further than a tip of the conductor in the first direction,
  the primer layer being annular around an outer periphery of a part of the terminal located further than the tip of the conductor in the first direction, and
  a width of the primer layer being 3 mm or more and 10 mm or less.

2. The terminal-equipped wire of claim 1, wherein the olefin-based resin is polyethylene or polypropylene.

3. The terminal-equipped wire of claim 1, wherein the primer layer has polyurethane or polypropylene as a main component.

4. The terminal-equipped wire of claim 1, wherein the molded resin portion has polybutylene terephthalate or polyamide as a main component.

5. The terminal-equipped wire of claim 1, wherein:
- a direction opposite to the first direction is a second direction, and
- a distance between an end part of the molded resin portion on the second direction side and an end of the insulation coating on the first direction side is 5 mm or more and 15 mm or less.

* * * * *